Figure 1:
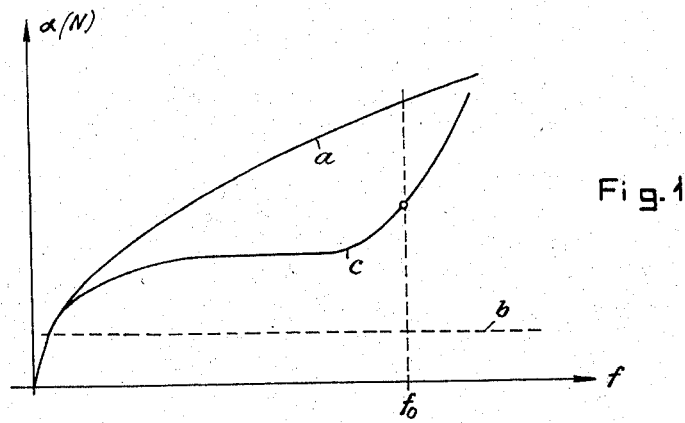

Inventors:
Walter Wild
and
Walter Eberl

Inventors:
Walter Wild
and
Walter Eberl

July 7, 1959  W. WILD ET AL  2,894,226
SYMMETRICAL CABLES, MORE PARTICULARLY COAXIAL OR SYMMETRICAL
PLANE CABLES FOR TRANSMISSION OF HIGH FREQUENCY CURRENT
Filed June 3, 1955  3 Sheets-Sheet 3

Inventors:
Walter Wild
and
Walter Eberl

United States Patent Office 2,894,226
Patented July 7, 1959

2,894,226

SYMMETRICAL CABLES, MORE PARTICULARLY COAXIAL OR SYMMETRICAL PLANE CABLES FOR TRANSMISSION OF HIGH FREQUENCY CURRENT

Walter Wild, Munich, and Walter Eberl, Berlin-Wilmersdorf, Germany, assignors to Siemens & Halske Aktiengesellschaft, Munich and Berlin, Germany, a joint-stock company Application June 3, 1955, Serial No. 513,051

Claims priority, application Germany June 4, 1954

11 Claims. (Cl. 333—96)

Our invention relates to symmetrical cables, more particularly to coaxial or symmetrical plane cables.

It is the object of our invention to reduce the losses occurring coincidentally to the transmission of high frequency currents by the cable.

Prior to our invention it was generally believed that the losses occurring in the transmission of electrical high frequency currents by coaxial cables can be reduced to a minimum by compliance with two conditions, one condition calling for a suitable ratio of the internal diameter of the outer conductor and the diameter of the inner conductor, and the other condition requiring that the dielectric filling the space intermediate the coaxial conductors is constructed as an air space insulation being composed of solid spacer elements and of a gaseous medium therebetween, the gaseous component filling as large a portion of the dielectric space as possible.

We have found that in a symmetrical cable comprising a pair of conductors and an intermediate dielectric which are symmetrically disposed with respect to at least one longitudinal plane, i.e. in a coaxial cable or symmetrical plane cable, the losses may be reduced considerably by embedding in the dielectric a small number of spaced conductive layers having a thickness which is a small fraction of the distance of the layers from one another.

Our invention must not be confused with the known proposition to dispose a pair of coaxial conductors in concentrical relationship, the middle tubular conductor constituting simultaneously the outer conductor of the inner coaxial conductor and the inner conductor of the outer coaxial conductor. In such duplex coaxial cables, the wall of the middle tubular conductor must be sufficiently thick to electrically separate the two conductors, and such thickness is far in excess of twice the equivalent conductive stratum or "skin depth."

Moreover, our invention is not identical with the known cables composed of a plurality of alternating metal layers and insulating layers. Computed on the basis of the views held heretofore by those skilled in the art the thickness of the metal layers of such prior cables is substantially smaller than the skin depth amounting to less than one tenth of the skin depth. The calculation shows that these prior cables will result in a minimum of losses if the thickness of the metal layers amounts to about twice the thickness of the insulating layers. The very small distance of the metal layers has the result that for a given thickness of the metal layers and for given total dimensions the resistance-losses increase rapidly (about proportional to the square of the frequency) when the frequency rises because of the concentration of the current in the conductive stratum or skin. At frequencies at which the thickness of the metal layers is small compared with the skin depth, this increase of the energy losses is so high that the resistance-losses are a multiple of the theoretical losses computed on the known basis.

Our invention is based on the consideration that in a coaxial cable comprising a pair of coaxial conductors and an intermediate dielectric quite unequal shares of the resistance-losses are borne by the outer conductor and the inner conductor. Since the electrically effective stratum of the outer layer has a much larger cross section than the electrically effective stratum of the inner layer, the losses in the outer layer are smaller than the losses in the innner layer for all frequencies. By embedding a small number of spaced conductive layers in the dielectric we ensure that within the range of frequencies utilized for the transmission, the transmission currents in the inner conductor and in the outer conductor will so adjust themselves that the losses become substantially equal in both conductors.

Figure 2:
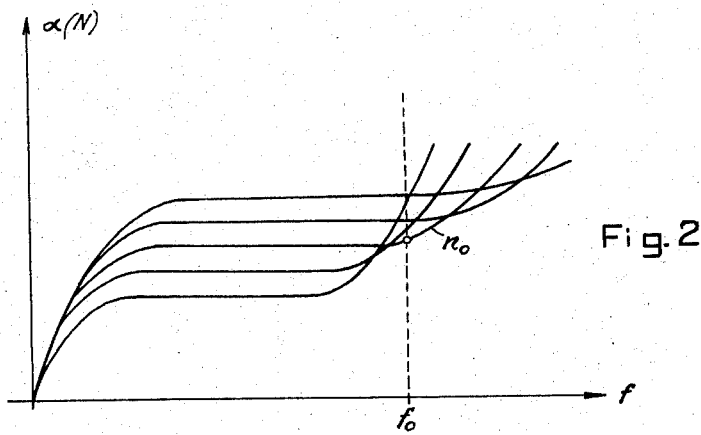
Figure 3:
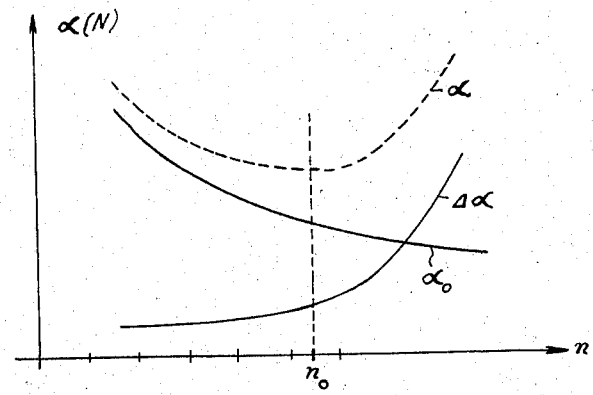

Further objects of our invention will appear from a detailed description of the invention following hereinafter with reference to a number of embodiments of our invention shown in the drawings, and the features of novelty will be pointed out in the claims. We wish it to be understood, however, that such detailed description serves the purpose of illustrating the invention rather than that of restricting or limiting the same. In the drawings, Fig. 1 is a graph showing how the losses depend on the frequency for various types of cables, Fig. 2 is a graph showing how the losses depend on the frequency in our novel cable depending on the number of the spaced conductive layers embedded in the dielectric, Fig. 3 is a graph showing how the basic losses, the additional losses and the resulting total losses depend on the frequency, Fig. 4 is a cross section of our improved coaxial cable for the transmission of high frequency currents in which the spaced conductive layers embedded in the dielectric are continuous metal foils, Fig. 5 is a diagrammatic perspective sectional view of a plane cable symmetrical with respect to a longitudinal plane, the spaced conductive layers embedded in the dielectric being formed by continuous metal foils.

Figure 4:
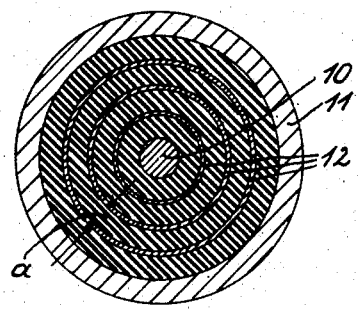
Figure 6:
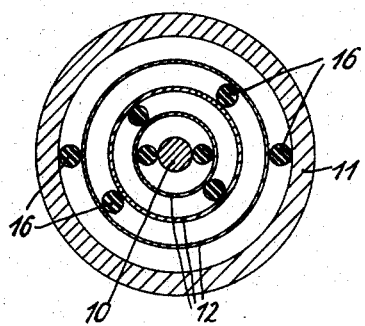
Figure 7:
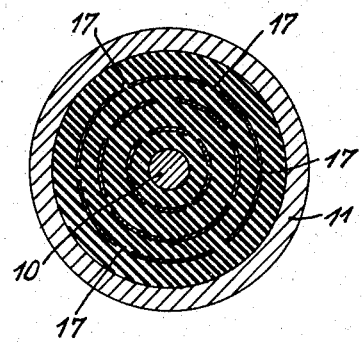
Figure 8:
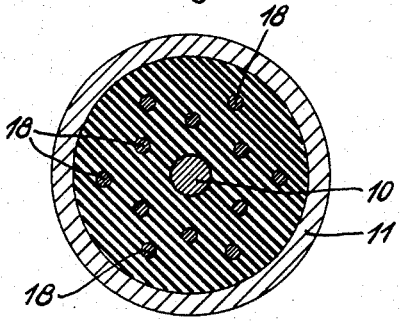
Figure 9:
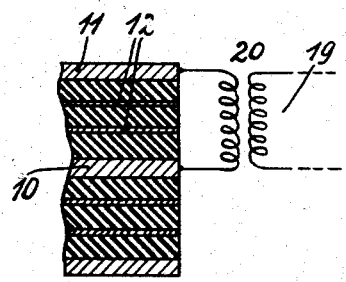
Figure 10:
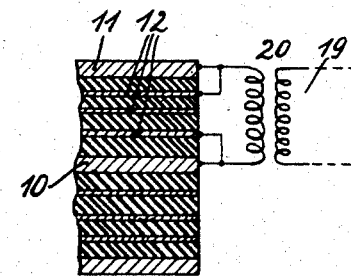
Figure 11:
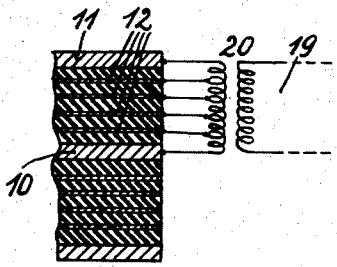
Figure 12:
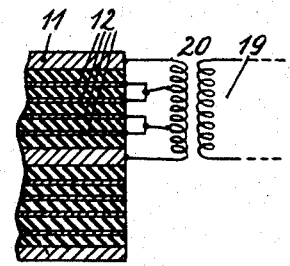

Fig. 6 is a cross section of a novel coaxial cable of the general type illustrated in Fig. 4, the dielectric, however, comprising solid spacers and a gaseous medium therebetween, Fig. 7 is a cross section of a novel coaxial cable in which each of the spaced conductive layers embedded in the dielectric is formed by a group of adjacent strips of metal foils, Fig. 8 is a cross section of the novel coaxial cable in which each of the spaced conductive layers embedded in the dielectric is formed by a group of conductor leads, Fig. 9 illustrates an electrical high frequency transmission system including an axial section through an end of a symmetrical cable of the type shown in Fig. 4 and a transformer connected thereto, Figs. 10, 11 and 12 are views similar to that of Fig. 9 of modified transmission systems including our improved coaxial cable.

Figure 5:
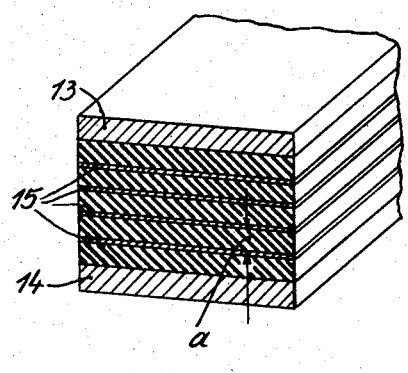

Figs. 4 and 5 illustrate the basic structure of our novel cable, Fig. 4 showing a coaxial cable and Fig. 5 showing a plane cable symmetrical to the vertical longitudinal plane. The reference in the claims to a "symmetrical cable comprising the combination of a pair of conductors and an intermediate dielectric, said conductors and said dielectric being symmetrical with respect to at least one longitudinal plane" is intended to apply to both types of cables, that shown in Fig. 4 and that shown in Fig. 5, since the coaxial cable shown in Fig. 4 is, in fact, symmetrical with respect to any diametrical plane thereof.

The coaxial cable shown in Fig. 4 comprises an inner conductor 10, an outer tubular conductor 11 coaxial thereto, and an intermediate dielectric. Three spaced conductive layers 12 are embedded in the dielectric subdividing the same into four insulating layers of the thickness $a$ which is very large compared with the thickness of the conductive layers 12. Each of the layers 12 may be formed by a metal foil.

The symmetrical plane cable shown in Fig. 5 comprises a pair of flat parallel conductive strips 13 and 14 and an intermediate dielectric in which four plane metal layers 15 are embedded. Preferably, the layers 12 and 15 are spaced equal distances from one another and from the conductors. The thickness of the layers 12 and 15 is a very small fraction of the distance of the layers from one another. This may be exemplified with reference to Fig. 4 as follows:

The inner conductor 10 may be a copper wire of a diameter of one millimeter. The outer conductor may be a sheath of aluminum having an internal diameter of 7.5 millimeters and a thickness of 1.5 millimeters. The conductive layers 12 may be formed by copper foil of a thickness of 0.02 millimeter. The dielectric may be a plastic foam consisting of polystyrene or polyethylene including air bubbles. This cable will be of particular usefulness for the transmission of high frequency currents of a frequency of more than two megacycles.

In Fig. 1 the curves indicate how the losses $\alpha$ expressed in neper (N) depend on the frequency $f$ for different cables having the same external diameter, the curve $a$ relating to a conventional coaxial cable, the curve $b$ relating to a prior multiple layer cable having alternating thin metal layers and insulating layers, and the curve $c$ relating to our novel cable, such as that described with reference to Fig. 4. For a definition of neper and skin depth note column 4 of Australian Patent 151,466 of May 18, 1953.

Curve $c$ shows clearly that the small number of conductive layers embedded in the dielectric results in a considerable reduction of the losses within a wide range of frequencies. While it is true that even smaller losses may be attained in a larger range of frequencies by alternating conductive layers and insulating layers, such cable is more expensive since it is composed of a larger number of components and, therefore, is uneconomical.

Our invention differs from such prior multi-layer cables by the use of an essentially smaller number of conductive layers and by a greater thickness of the same. According to our invention, the thickness of the spaced conductive layers, such as layers 12 and 15 in Figs. 4 and 5, is preferably so chosen that it amounts to from one fifth to one half of the thickness of the equivalent conductive stratum (skin depth) effective at the maximum transfer frequency chosen.

The reduction of the losses of a coaxial cable which we attain by the interposition between the conductors of the conductive layers, such as layers 12 and 15, depends on the number of the layers. This dependency is such that a minimum loss and the consequent best reduction of the loss are obtained with a definite number of layers, or a definite spacing thereof respectively.

This will appear from the following consideration of the coaxial cable described with reference to Fig. 4 in which the internal diameter of the outer conductor 11 amounts to D, the diameter of the inner conductor 10 amounts to $d$, and the number of conductive layers 12 amounts to $n$, such conductive layers subdividing the dielectric into $n+1$ insulating layers. The interposition of the conductive layers 12 between the conductors 10 and 11 results in a maximum gain in energy when a high frequency current of the frequency $f_0$ is transmitted by the cable. The thickness of the intermediate conductive layers 12 amounts to $d_m$ and with the frequency $f_0$ is larger than one fifth of the skin depth. $d_m$ is chosen so as to meet economical and manufacturing requirements.

The calculation shows that the total loss of energy in the cable is composed of a portion independent of the frequency and of a portion depending on the frequency. Therefore, the loss $\alpha_{(f_0)}$ occurring in the transmission of a current having the frequency $f_0$ may be expressed by the equation:

$$\alpha_{(f_0)} = \alpha_0 + \Delta\alpha_{(f_0)}$$

We have found that these two components depend on the number $n$ of the conductive layers in a different manner, as will appear from the two full line curves in Fig. 3. Therefore, the total loss $\alpha_{(f_0)}$ has a minimum for a definite number $n$ of conductive layers and for a given frequency $f_0$.

In Fig. 2 we have shown a number of computed curves indicating the losses of cables differing by the number $n$ of intermediate conductive layers, the top curve applying to the cable having the largest number of intermediate conductive layers and the bottom curve applying to a cable having the smallest number of intermediate conductive layers in the dielectric, the intermediate curves applying to cables having intermediate numbers of conductive layers. The curves shown in Fig. 2 indicate that we may reduce the loss by increasing the number of intermediate conductive layers in the dielectric, provided that the cable is operated within a lower range of frequencies, and that we may reduce the loss by reducing the number of intermediate layers where the cable is operated within a higher range of frequencies. In other words, with an increasing number of conductive layers the losses drop in the lower range of frequencies, but grow in a higher range of frequencies. Moreover, it will appear from Fig. 2 how the loss $\alpha$ depends on the number of conductive layers with a given frequency $f_0$.

This relationship of the loss to the number of layers for a given frequency $f_0$ is illustrated in Fig. 3 in which the two component losses $\alpha_0$ and $\Delta\alpha$ are represented in dependence on $n$ by two curves shown in full lines, whereas the resulting total loss is indicated by the curve formed by a dotted line. Fig. 3 shows that with the particular cable under consideration a minimum of losses will be attained where the number of layers amounts substantially to $n_0$. By so choosing the best number $n$ we may attain minimum losses of the cable constructed in accordance with our invention.

As stated hereinabove, we prefer to use a dielectric having a gaseous component, such as air, although a solid dielectric may be used. Any suitable insulating material having a low dielectric constant and a low dielectric loss may be employed for the solid dielectric or the solid component thereof, such as polystyrene, polyethylene or the like.

In Fig. 6 we have shown a cross section through a cable differing from that described with reference to Fig. 4 by the nature of the dielectric. The dielectric is formed by air and by spacers 16 of a solid material wound to extend helically, the windings of one spacer being suitably spaced from the windings of the adjacent spacer. The spacers may be preferably formed by cords consisting of polystyrene or polyethylene.

The conductive layers embedded in the dielectric need not be continuous layers as described hereinabove with reference to Fig. 4. Each layer may comprise a group of spaced elongated metal elements, such as leads 18 shown in Fig. 8, or strips shown in Fig. 7, of metal foil. The elongated metal elements preferably extend lengthwise of the cable or along helices.

In Fig. 7 each of the intermediate layers is formed by six strips which are so spaced as to leave gaps 17 between their opposed longitudinal edges. The thickness of the elongated metal elements, of which the conductive layers shown in Figs. 7 and 8 are composed, may be made larger than the skin depth. It will be noted that the dielectric insulates each of the elongated metal elements from the other elongated metal elements.

In Fig. 8 we have shown a cable in which two intermediate layers are disposed between the inner conductor 10 and the outer conductor 11, each layer being composed of six leads 18. The six leads 18 of each layer are preferably twined about the inner conductor, which means that each of the leads 18 extends helically. Alternatively, three or four insulated leads may be twined about a common axis. If desired, the leads may be interconnected in accordance with the return principle which is frequently applied to flexible high frequency cables. Moreover, each lead, such as 18, may be composed of a plurality of a small number of twined insulated wires having thin insulating coats.

Where each lead 18 is composed of a plurality of twined wires we prefer, however, to keep such wires spaced a distance much larger than their diameters preferably by a suitable air space insulation. In this embodiment, too, the diameter of the wires, of which each lead 18 is composed, may be made larger than the thickness of the equivalent conductive stratum.

In manufacturing the cable shown in Fig. 8 we may proceed by applying a sheath of dielectric material surrounding the conductor 10 and by then placing the six leads 18 constituting the inner conductive layer on the dielectric sheath. Then another dielectric sheath is applied covering the six leads, whereupon the six leads 18 constituting the outer conductive layer are applied to the periphery of the second sheath. Then a third dielectric layer is put on to cover the leads 18 of the outer conductive layer. Finally, an aluminum sheath 11 is applied in a known manner.

Because of the small number of conductive layers the invention offers the additional advantage over the multilayer cables that transmission elements, such as transmitters, receivers, amplifiers and the like, may be more easily connected to the cable, and that the mutual connection of successive lengths of cables is essentially facilitated.

Figs. 9 to 12 illustrate various electrical high frequency transmission systems including our novel coaxial cable. In all of these figures the inner conductor 10 is surrounded by the outer conductor 11, and the dielectric therebetween includes spaced conductive layers 12 as described hereinabove. The end of our novel coaxial cable is connected to a transmitting circuit 19 by means of a transformer 20.

In the system illustrated in Fig. 9 the inner conductor 10 and the outer conductor 11 only are connected with the transformer 20. In Fig. 10, however, a transmission system is shown in which at the ends of the cable each of the conductors 10 and 11 is electrically connected with the adjacent one of the conductive layers 12, whereas the rest of the conductive layers is left free from any electrical connection. Thus, it will appear that the inner conductor 10 and the adjacent conductive layer 12 are connected to one terminal of the transformer 20, and that the outer conductor 11 and the adjacent conductive layer 12 are connected with each other and with the terminal of the transformer 20. The remaining conductive layer 12 is left free from any electrical connection.

In Fig. 11 an electrical high frequency transmission system is shown which includes a coaxial cable as above described having an inner conductor 10 surrounded by an outer conductor 11. Moreover, the system includes a voltage divider in form of a transformer 20, one winding of which is tapped at as many points as intermediary conductive layers are provided. Each of the conductors 10 and 11 and each of the conductive layers is connected with one of the terminals. Hence, all of these conductive layers are individually connected to a predetermined potential of the transformer 20. For the transformer 20 any other voltage divider may be substituted. It is also possible, however, to connect up pluralities of conductive layers to groups and to connect the groups so formed to predetermined potentials, as illustrated in Fig. 12 for instance. Owing to such couplings, particularly as shown in Figs. 11 and 12, the coaxial cable may be matched to the transmission circuit 19 to avoid reflection.

While in Fig. 4 the elements of the cable have circular cross sections, they may have any other cross section which is symmetrical to at least one diametrical line.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a high frequency current transmission system, a symmetrical cable comprising a pair of conductors connected in said system to carry said current, and an intermediate dielectric, said conductors and said dielectric being symmetrical with respect to at least one longitudinal plane of said cable, a number of conductive layers in said dielectric and equidistantly spaced from one another and said conductors, each of said layers having a thickness of from about ⅕ to ½ of the thickness of the skin depth or equivalent conductive stratum effective at the maximum transfer frequency and the number of said spaced conductive layers being not greater than four.

2. The system defined in claim 1, in which each of said layers comprises a group of laterally spaced elongated metal elements.

3. The system defined in claim 1, in which each of said layers comprises a group of laterally spaced strips of metal foil.

4. The system defined in claim 1, in which said dielectric is formed by an air-containing insulating material having a small dielectric coefficient and a small dielectric loss factor.

5. The system defined in claim 1, in which the ends of said conductive layers are free from any electrical connections.

6. The system defined in claim 1, in which at the ends of the cable each of said conductors is electrically connected with the adjacent one of said conductive layers, whereas the rest of said conductive layers is left free from any electrical connection.

7. The electrical high frequency transmission system defined in claim 1, in which a voltage divider is associated with at least one end of said cable, said voltage divider being provided with a plurality of terminals having different potentials, each of said conductors and each of said layers being connected with one of said terminals.

8. The transmission system defined in claim 1 in which the system includes a transmitting circuit, the said pair of conductors being connected to each other through a coil which is inductively connected in said circuit.

9. In a high frequency current transmission system, a symmetrical cable comprising a pair of conductors connected in said system to carry said current, and an intermediate dielectric, said conductors and said dielectric being symmetrical with respect to at least one longitudinal plane of said cable, a small number of spaced conductive layers embedded in said dielectric, each of said layers having a thickness which is a minor fraction of the distance of said layers from one another but at least about one-fifth of the skin depth in the range of frequencies transmitted by the system, and a voltage divider connected to at least one end of the said cable, said voltage divider being provided with a plurality of terminals having different potentials, each of said pair of conductors being connected to one of said terminals, and adjacent groups of the conductive layers each being connected to another one of said terminals.

10. In a high frequency current transmission system, a symmetrical cable comprising a pair of conductors connected in said system to carry said current, and an intermediate dielectric, said conductors and said dielectric being symmetrical with respect to at least one longitudinal plane of said cable, a number of conductive layers of metal foil in said dielectric and equidistantly spaced from one another and said conductors, each of said layers having a thickness of from about 1/5 to 1/2 of the thickness of the skin depth or equivalent conductive stratum effective at the maximum transfer frequency and the number of said spaced conductive layers being not greater than four.

11. In a high frequency current transmission system, a symmetrical cable comprising a pair of conductors connected in said system to carry said current, one of said conductors coaxially surrounding the other, and an intermediate dielectric, said conductors and said dielectric being symmetrical with respect to at least one longitudinal plane of said cable, said dielectric being formed by a helicoidal spacer and by air filling the space between the helices thereof, a number of spaced conductive layers of metal foil in said dielectric, each of said layers having a thickness of from 1/5 to 1/2 of the thickness of the skin depth or equivalent conductive stratum effective at the maximum transfer frequency and the number of said spaced conductive layers being not greater than four.

References Cited in the file of this patent

UNITED STATES PATENTS

| | | |
|---|---|---|
| 1,701,278 | Silbermann | Feb. 5, 1929 |
| 2,769,147 | Black et al. | Oct. 30, 1956 |
| 2,769,148 | Clogston | Oct. 30, 1956 |
| 2,782,251 | Ebel | Feb. 19, 1957 |

OTHER REFERENCES

"The Bell System Technical Journal," vol. 30, No. 3, July 1951, pages 491–529.